(12) United States Patent
Wang (10) Patent No.: US 12,322,174 B2
(45) Date of Patent: Jun. 3, 2025

(54) INTERACTIVE USER INTERFACE FOR FEATURE ENGINEERING AND DATA PROCESSING ON GEOSPATIAL MAPS

(71) Applicant: Deere & Company, Moline, IL (US)

(72) Inventor: Nanzhu Wang, Kirkland, WA (US)

(73) Assignee: Deere & Company, Moline, IL (US)

( * ) Notice: Subject to any disclaimer, the term of this patent is extended or adjusted under 35 U.S.C. 154(b) by 439 days.

(21) Appl. No.: 17/946,918

(22) Filed: Sep. 16, 2022

(65) Prior Publication Data

US 2024/0094735 A1     Mar. 21, 2024

(51) Int. Cl.
*G06V 20/00*     (2022.01)
*A01B 79/00*     (2006.01)
*G06Q 10/0639*     (2023.01)
*G06Q 50/02*     (2012.01)
*G06V 20/10*     (2022.01)

(52) U.S. Cl.
CPC .......... *G06V 20/188* (2022.01); *A01B 79/005* (2013.01); *G06Q 10/0639* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 2007/0089390 A1 | 4/2007 | Hendrickson et al. | |
| 2013/0080504 A1* | 3/2013 | Maurer | G06T 11/00 709/203 |
| 2018/0018517 A1 | 1/2018 | Zhong et al. | |
| 2018/0349520 A1 | 12/2018 | Bhalla et al. | |
| 2020/0019777 A1* | 1/2020 | Gurzoni, Jr. | G06V 10/803 |
| 2020/0293505 A1* | 9/2020 | Ozakdag | G06F 16/2228 |

* cited by examiner

*Primary Examiner* — Martin Mushambo
(74) *Attorney, Agent, or Firm* — HANLEY, FLIGHT & ZIMMERMAN, LLC (57) ABSTRACT

Techniques are described herein for an interactive user interface for feature engineering and data processing on geospatial maps. A method includes: receiving user input indicating a selection of a first agricultural data source; receiving user input indicating a geometry on a map, the geometry defining a geographic region on which to perform at least one operation; receiving user input defining the at least one operation to be performed on the geographic region; generating an agricultural analysis request based on the first agricultural data source, the geometry, and the the at least one operation to be performed on the geographic region; decoding the agricultural analysis request to generate an operation tree including a plurality of operation nodes; executing each of the operation nodes to generate an agricultural analysis result corresponding to the geographic region; and displaying a visual representation based on the agricultural analysis result corresponding to the geographic region.

20 Claims, 5 Drawing Sheets

INTERACTIVE USER INTERFACE FOR FEATURE ENGINEERING AND DATA PROCESSING ON GEOSPATIAL MAPS

BACKGROUND

Agricultural entities such as individual farmers, agricultural cooperatives, and agricultural companies may periodically investigate farmland for a variety of purposes. For example, a farmer may wish to determine whether a particular crop field is a good candidate for expansion (e.g., acquisition, leasing, etc.). However, this can be a daunting task. There may be countless crop fields available, each with its own unique characteristics and/or history of stewardship. Moreover, a particular crop field's suitability to grow a particular variety of a crop—which may be manifested as an expected crop yield in some cases—is dependent on myriad factors. These factors may include, but are not limited to, climate, soil composition, prevalence of plant disease (e.g., pests, fungus) and/or weeds in the area, and so forth. Farmland may be investigated for other purposes as well. For example, farmland valuation and/or crop insurance evaluation may involve quantifying risk of crop loss due to factors such as flood, drought, etc.

A farmland database may be used by agricultural entities to store, edit, and retrieve various information about farmland, including field boundaries, climate, soil composition, prevalence of plant disease (e.g., pests, fungus) and/or weeds in the area, and/or any other characteristics. Additionally, such a database may be used by agricultural entities to store, edit, and retrieve observational crop data obtained by farm machinery. For example, some tractors and harvesters are configured to automatically collect and log various data, such as digital images of crops, where they were operated (e.g., using position coordinate data), etc. In some cases, tractor-generated and harvester-generated data associated with a field may be uploaded by one or more tractors and harvesters (e.g., in real time or during downtime) to a database that is a central repository of tractor-generated and harvester-generated data. Agricultural entities may utilize this data for various purposes (e.g., to analyze crop yields, determine whether a particular crop field is a good candidate for expansion, etc.).

Geospatial data collected using remote sensing, including digital images captured from high elevations, such as satellite images, images captured by unmanned aerial vehicles, manned aircraft, or images captured by high elevation manned aircraft (e.g., space shuttles), are becoming increasingly important for agricultural applications, such as estimating a current state or health of a field. However, analyzing geospatial data collected using remote sensing presents various challenges. For example, it may be challenging for users to analyze such geospatial data using custom, user-defined operations.

SUMMARY

Techniques described herein relate to interactive graphical user interfaces that provide for feature engineering and data processing of geospatial data. In various implementations, a graphical user interface may be provided that includes an indication of available geospatial data sources, a visual representation of a data processing flow, and a map. A user may use the graphical user interface to select geospatial data sources (e.g., select satellite tiles), construct a data flow for data processing, geo-joining, and feature engineering, and draw geometries on the map for data calculation. An analysis request may be generated based on the selected geospatial data sources, the data flow, and the geometries drawn on the map. This analysis request may be sent to a remote server to be decoded to generate an operation tree. Each of the operation nodes in the operation tree may be executed to generate an analysis result, and a visual representation based on the analysis result may be provided on the graphical user interface.

In various implementations, a method includes: receiving, via a graphical user interface (GUI), user input indicating a selection of a first agricultural data source including remote sensing data; receiving, via the GUI, user input indicating a geometry on a map, the geometry defining a geographic region on which to perform at least one operation; receiving, via the GUI, user input defining the at least one operation to be performed on the geographic region, the at least one operation using at least one satellite tile of the first agricultural data source, the at least one satellite tile corresponding to the geographic region; generating an agricultural analysis request based on the user input indicating the selection of the first agricultural data source, the user input indicating the geometry defining the geographic region on which to perform the at least one operation, and the user input defining the at least one operation to be performed on the geographic region; decoding the agricultural analysis request to generate an operation tree including a plurality of operation nodes; executing each of the operation nodes in the operation tree to generate an agricultural analysis result corresponding to the geographic region; and displaying, on the GUI, a visual representation based on the agricultural analysis result corresponding to the geographic region.

In some implementations, the method further includes receiving, via the GUI, user input indicating a selection of a second agricultural data source including field data. In some implementations, the at least one operation further uses the field data of the second agricultural data source; and generating the agricultural analysis request is further based on the user input indicating the selection of the second agricultural data source. In some implementations, the field data includes observational crop data obtained by farm machinery. In some implementations, the field data is used as ground truth.

In some implementations, the first agricultural data source includes a satellite tile source that includes near-infrared wavelength satellite tiles. In some implementations, the first agricultural data source includes a satellite tile source that includes red wavelength satellite tiles.

In some implementations, the at least one operation includes an add operation, a subtract operation, a multiply operation, and/or a divide operation. In some implementations, the analysis request is a JavaScript Object Notation (JSON) object.

In some implementations, the method further includes optimizing the operation tree, prior to executing each of the operation nodes in the operation tree. In some implementations, optimizing the operation tree includes removing duplicate operations from the operation tree. In some implementations, the operation tree is a directed acyclic graph.

In some additional or alternative implementations, a computer program product includes one or more non-transitory computer-readable storage media having program instructions collectively stored on the one or more computer-readable storage media, the program instructions being executable to: receive, via a graphical user interface (GUI), user input indicating a selection of at least one remote sensing agricultural data source; receive, via the GUI, user input indicating a selection of at least one agricultural field;

receive, via the GUI, user input defining a data processing flow indicating data processing to be performed on a dataset retrieved from the at least one remote sensing agricultural data source, the dataset including tiles corresponding to the at least one agricultural field; generate an agricultural analysis request based on the user input indicating the selection of the at least one remote sensing agricultural data source, the user input indicating the selection of the at least one agricultural field, and the user input defining the data processing flow; decode the agricultural analysis request to generate an operation tree including a plurality of operation nodes; execute each of the operation nodes in the operation tree to generate an agricultural analysis result corresponding to the at least one agricultural field; and provide, on the GUI, a visual representation based on the agricultural analysis result corresponding to the at least one agricultural field.

In some additional or alternative implementations, a system includes a processor, a computer-readable memory, one or more computer-readable storage media, and program instructions collectively stored on the one or more computer-readable storage media, the program instructions being executable to: receive, via a graphical user interface (GUI), user input indicating a selection of a first agricultural data source including remote sensing data; receive, via the GUI, user input indicating a geometry on a map, the geometry defining a geographic region on which to perform at least one operation; receive, via the GUI, user input defining the at least one operation to be performed on the geographic region, the at least one operation using at least one satellite tile of the first agricultural data source, the at least one satellite tile corresponding to the geographic region; generate an agricultural analysis request based on the user input indicating the selection of the first agricultural data source, the user input indicating the geometry defining the geographic region on which to perform the at least one operation, and the user input defining the at least one operation to be performed on the geographic region; decode the agricultural analysis request to generate an operation tree including a plurality of operation nodes; execute each of the operation nodes in the operation tree to generate an agricultural analysis result corresponding to the geographic region; and display, on the GUI, a visual representation based on the agricultural analysis result corresponding to the geographic region.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
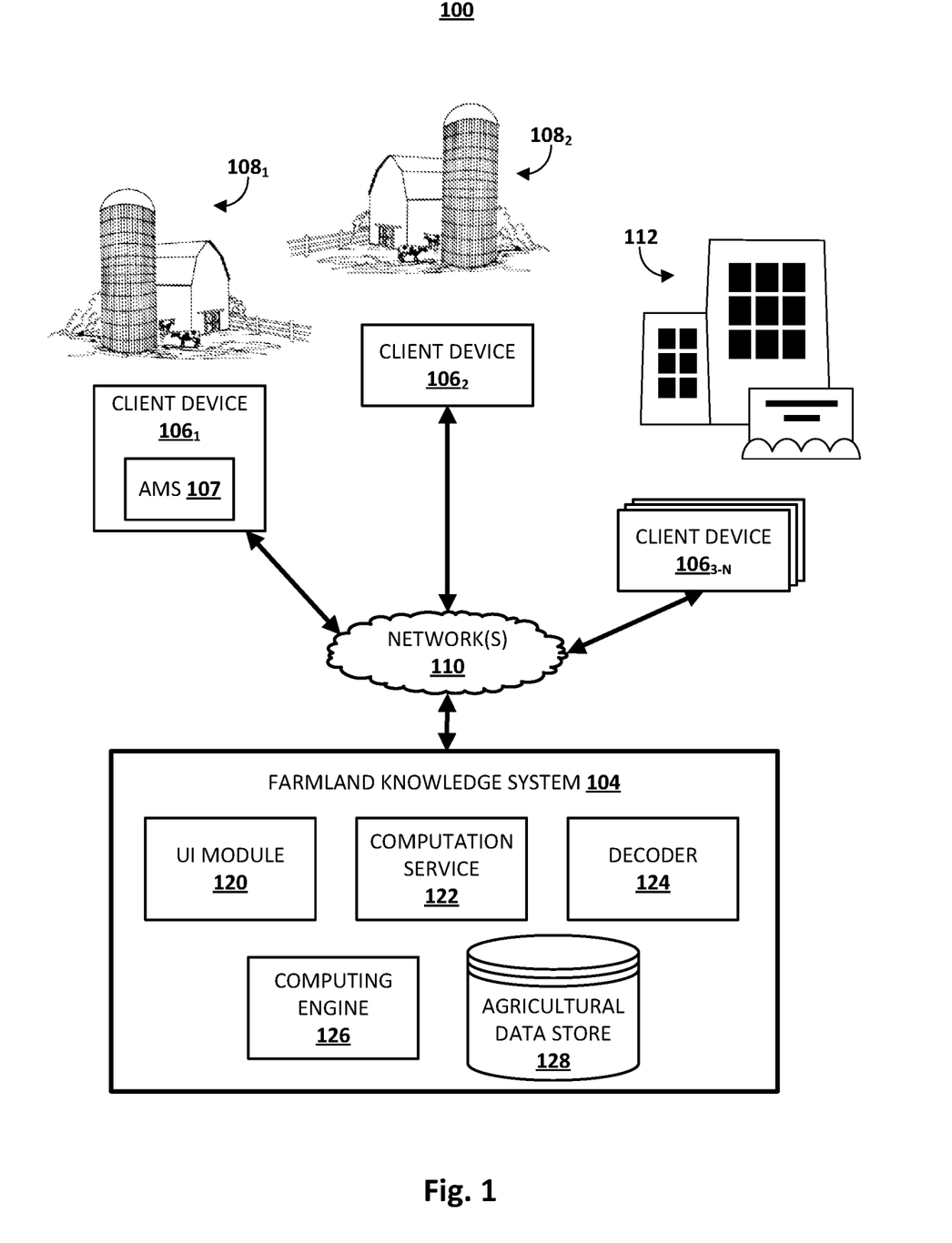
FIG. 1 depicts an example environment in which selected aspects of the present disclosure may be implemented, in accordance with various implementations.

FIG. 1 depicts an example environment 100 in which one or more selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Various components in the environment 100 are in communication with each other over one or more networks 110. Network(s) 110 may take various forms, such as one or more local or wide area networks (e.g., the Internet), one or more personal area networks (PANs), one or more mesh networks (e.g., ZigBee, Z-Wave), etc.

An individual (who in the current context may also be referred to as a "user") associated with an agricultural entity may operate one or more client devices $106_{1-N}$ to interact with other components depicted in FIG. 1. A client device 106 may be, for example, a laptop computing device, a desktop computing device, a tablet computing device, a mobile phone computing device, a computing device of a vehicle of the user/agricultural entity (e.g., an in-vehicle communications system, navigation system, entertainment system, or any other computing device integrated into or mounted on a farm vehicle such as a tractor or harvester), a standalone interactive speaker (with or without a display), or a wearable apparatus that includes a computing device, such as a head-mounted display (HMD) that provides an augmented reality (AR) or virtual reality (VR) immersive computing experience, a "smart" watch, and so forth.

Farmland knowledge system 104 is an example of an information system in which the techniques described herein may be implemented. Each of client devices 106 and farmland knowledge system 104 may include one or more memories for storage of data and software applications, one or more processors for accessing data and executing applications, and other components that facilitate communication over a network. The operations performed by client device 106 and/or farmland knowledge system 104 may be distributed across multiple computer systems. Some of the systems depicted in FIG. 1, such as the farmland knowledge system 104, may be implemented using one or more server computing devices that form what is sometimes referred to as a "cloud infrastructure," although this is not required.

In FIG. 1, first client device $106_1$ is associated with (e.g., controlled and/or maintained by) a first agricultural entity in the form of a first farm 108₁. Similarly, a second client device 106₂ is associated with a second agricultural entity in the form of a second farm 108₂. One or more additional client devices 106₃₋ₙ are associated with another agricultural entity that takes the form of an organization 112 such as a commercial entity, a farming cooperative or "co-op", a governmental agency or department, etc. The environment 100 depicted in FIG. 1, including the particular arrangement of agricultural entities and client devices that is depicted, is not meant to be limiting. Individual farms may be associated with multiple client devices, for instance.

Although not shown in FIG. 1, in various implementations, various devices may be deployed at each farm to, for instance, capture agricultural data, including field data, at the farm. This field data may include, but is not limited to, observational crop data, climate features, edaphic features, landform features, and so forth. These devices may include, but are not limited to, manned and/or unmanned aerial vehicles, farming equipment that is autonomous, driven by a person or towed by another vehicle, in-situ sensors such as weather stations, soil moisture monitors, etc.

In some implementations, the client devices 106 may operate a variety of different applications that may be used to perform various agricultural tasks, such as feature engineering and data processing on geospatial maps, crop yield prediction and diagnosis, field searching, field-level crop management, plant-level phenotyping, etc. For example, first client device 106₁ operates agricultural management software (AMS) 107 (e.g., which may be standalone or part of another application, such as part of a web browser). Other client devices 106 may operate similar applications. In some implementations, AMS 107 may include various components that, alone or in combination, perform selected aspects of the present disclosure. For example, AMS 107 may provide an interactive user interface for feature engineering and data processing on geospatial maps.

In various implementations, a user may operate a client device 106 (e.g., via AMS 107) to access particular data in the farmland knowledge system 104. For example, a user may operate a client device 106 via AMS 107 to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104. A user may operate a client device 106 via AMS 107 to perform various feature engineering and data processing tasks. For example, a user may operate a client device 106 via AMS 107 to compute an enhanced vegetation index (EVI), used to quantify vegetation greenness, for a particular geographic area (e.g., a particular field). AMS 107 may provide a visualization of pixel-level EVI results around the particular geographic area. AMS 107 may also provide for aggregation of time-series pixel-level EVI results into one or more fields in the particular geographic area, and the time-series field-level EVI results may be visualized, e.g., in a line chart, for further analysis and model training.

In various implementations, farmland knowledge system 104 may be implemented across one or more computing systems that may be referred to as the "cloud". Farmland knowledge system 104 may include various components that, alone or in combination, perform selected aspects of the present disclosure. For example, in FIG. 1, farmland knowledge system 104 includes a user interface (UI) module 120, a computation service 122, a decoder 124, a computing engine 126, and an agricultural data store 128. One or more of these modules may be omitted and/or combined with other modules, and may be implemented using any combination of hardware and software. In this specification, the terms "data store", "database", and "index" will be used broadly to refer to any collection of data. The data of the data store, database, and/or index does not need to be structured in any particular way and it can be stored on storage devices in one or more geographic locations.

UI module 120 of farmland knowledge system 104 may provide an interface through which applications such as AMS 107 may interface with farmland knowledge system 104 in order to implement selected aspects of the present disclosure. As one non-limiting example, UI module 120 may generate and/or distribute scripts, executable files, and/or interactive documents written in markup languages such as hypertext markup language (HTML) and/or extensible markup language (XML) (e.g., "web pages"). A user associated with an agricultural entity may operate an application on a client device 106 such as a web browser (not depicted) or AMS 107 to interact with these items. Additionally or alternatively, in some implementations, UI module 120 may provide an application programming interface (API) to which AMS 107 may connect. In some such implementations, AMS 107 may render its own graphical user interface (GUI) based on data exchanged with UI module 120.

UI module 120 may be configured to render, or cause AMS 107 of a client device 106 to render, as part of a GUI, a map of a geographic area containing a plurality of agricultural fields. In some implementations, the map rendered/provided by UI module 120 may take the form of satellite imagery that depicts the geographic area from a high elevation. In other implementations the map of the geographic area may be rendered using raster (bitmap) or vector graphics. In either case, UI module 120 may annotate the plurality of agricultural fields visually on an individual agricultural field-basis to convey one or more properties. For example, all agricultural fields having a particular attribute value for one or more properties may be colored or pattern-filled uniformly.

UI module 120 may be configured to render, or cause AMS 107 of a client device 106 to render, as part of the GUI, an interface by which a user may perform tasks such as feature engineering and data processing on geospatial maps. In particular, through the GUI, an interface may be provided by which a user may provide user input indicating a selection of one or more agricultural data sources (e.g., from agricultural data store 128); user input indicating a geometry on a map, the geometry defining a geographic region on which to perform at least one operation; and user input defining the at least one operation to be performed on the geographic region, the at least one operation being performed using data of the selected agricultural data sources.

In some implementations, computation service 122 of farmland knowledge system 104 may be a web service or API and may receive an agricultural analysis request generated, by AMS 107 and/or UI module 120, responsive to user input received through the interface provided by UI module 120, the user input indicating a selection of one or more agricultural data sources, a geometry defining a geographic region on which to perform at least one operation, and defining the at least one operation to be performed on the geographic region. The agricultural analysis request generated by AMS 107 and/or UI module 120 and received by computation service 122 may be a serialized JavaScript Object Notation (JSON) object.

In some implementations, decoder 124 of farmland knowledge system 104 may include a decoding layer that decodes the agricultural analysis request (e.g., the serialized JSON object) received by computation service 122 to generate an operation tree including a plurality of operation nodes. Decoder 124 may optionally include an optimization layer that optimizes the operation tree generated by the decoding layer of decoder 124. Optimizing the operation tree may include, e.g., removing duplicate operations from the operation tree and/or reordering operations in the operation tree.

In some implementations, computing engine 126 of farmland knowledge system 104 may execute each operation node in the operation tree generated (and optionally optimized) by decoder 124 to generate an agricultural analysis result. Computing engine 126 may use a hash map to cache temporary results while executing the operation nodes of the operation tree. Computing engine 126 may provide the agricultural analysis result to UI module 120, either directly or via computation service 122. UI module 120 may be configured to render, or cause AMS 107 of a client device 106 to render, as part of a GUI, the agricultural analysis result. This agricultural analysis result may be displayed on the map of the geographic area containing the plurality of agricultural fields.

In some implementations, agricultural data store 128 of farmland knowledge system 104 may be configured to store, gather, collect, request, obtain, and/or retrieve raw agricultural data, including geospatial data collected using remote sensing and field data. The raw agricultural data may be from a variety of different sources, such as agricultural personnel, farm machinery, robot(s), aerial drones, satellite imagery, and so forth. Agricultural data store 128 may include a raw agricultural data index that stores that raw agricultural data. This agricultural data may be associated with individual agricultural fields, and may include various types of information (i.e. "features") about each agricultural field, such as climate features, edaphic features, landform features, and so forth. Climate features may include, for instance, precipitation levels/frequencies, temperatures, sunlight exposure, wind, humidity, plant disease, evapotranspiration (the sum of evaporation from the land surface plus transpiration from plants), and so forth. Edaphic features may include various information about soil, such as soil composition, soil pH, soil moisture, fraction data, soil organic carbon content, etc. Landform features may include, for instance, elevation, slope, distance to water, etc. In general, any type of data that has any influence on crop growth in an agricultural field ("agriculturally relevant") may be stored in agricultural data store 128.

Figure 2:
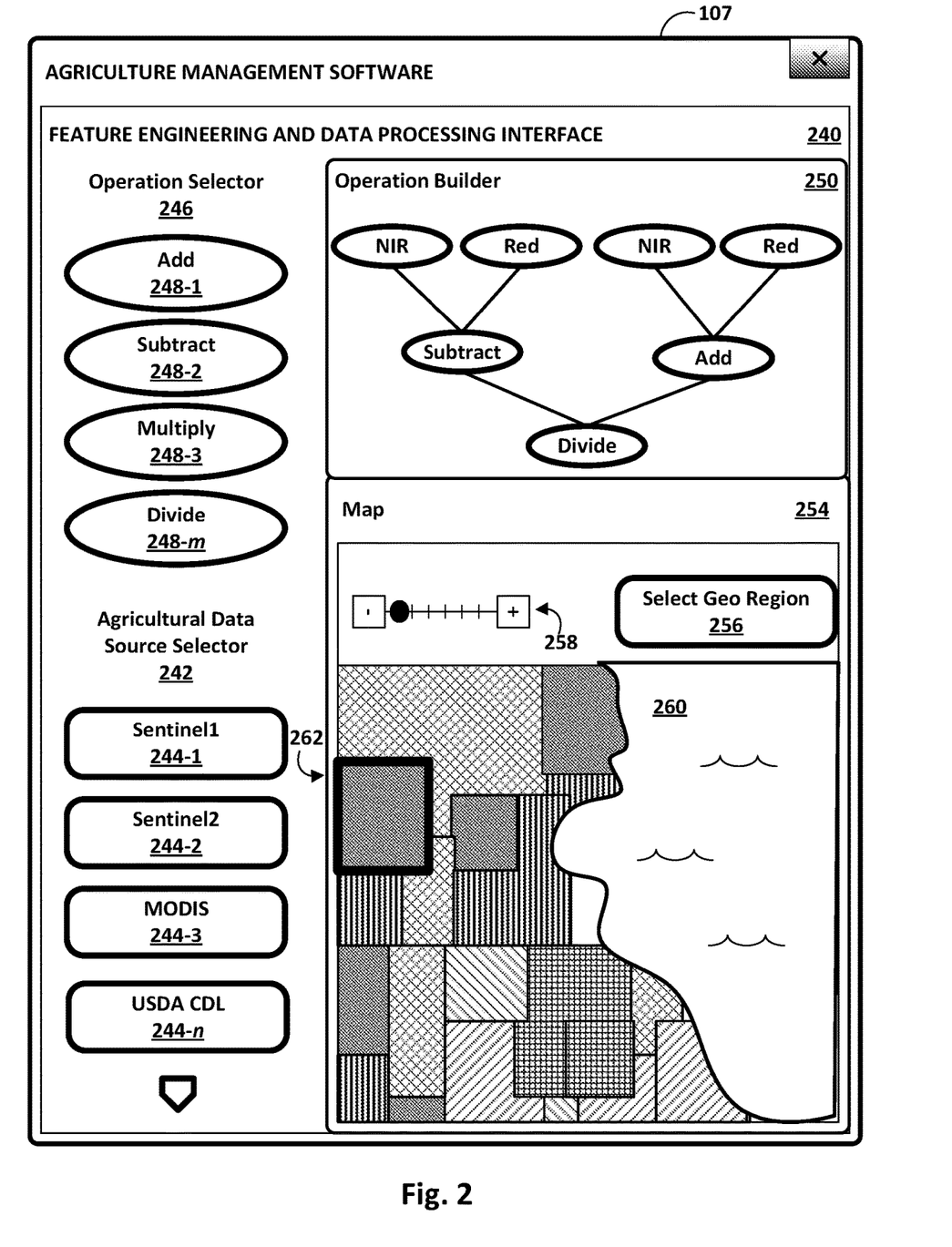
FIG. 2 depicts an example graphical user interface (GUI) that is rendered in accordance with selected aspects of the present disclosure, in accordance with various implementations.

FIG. 2 depicts one example of a GUI that may be rendered by AMS 107 in cooperation with UI module 120, in accordance with various implementations. The GUI includes a feature engineering and data processing interface 240.

Feature engineering and data processing interface 240 is an interface by which a user may provide user input indicating a selection of one or more agricultural data sources, as well as user input defining at least one operation to be performed on a geographic region. Feature engineering and data processing interface 240 may include agricultural data source selector 242, which may be usable by a user to provide user input indicating a selection of one or more agricultural data sources and/or one or more data sets provided by one or more agricultural data sources (e.g., Sentinel2 band 4, Sentinel2 band 8, etc.). As an example, the agricultural data source selector 242 may include Sentinel1 button 244-1, Sentinel2 button 244-2, MODIS button 244-3, ..., and USDA CDL button 244-n. Agricultural data source selector 242 is depicted as a set of buttons, but this is not meant to be limiting. Agricultural data source selector 242 may take other forms, such as check boxes (e.g., to apply/remove data sources), text inputs, sliders, radio buttons, etc.

Feature engineering and data processing interface 240 may also include operation selector 246, which may be usable by a user to provide user input defining at least one operation to be performed on a geographic region. As an example, operation selector 246 may include add button 248-1, subtract button 248-2, multiply button 248-3, ..., and divide button 248-m. Operation selector 246 is depicted as a set of buttons, but this is not meant to be limiting. Operation selector 246 may take other forms, such as check boxes (e.g., to apply/remove data operations), text inputs, sliders, radio buttons, etc.

Feature engineering and data processing interface 240 may also include operation builder 250, which a user may use to define one or more operations to be performed on a geographic region. For example, a user may drag and connect one or more agricultural data source buttons 244 of the agricultural data source selector 242 and one or more operation buttons 248 of the operation selector 246 into operation builder 250 to specify one or more operations to be performed on the one or more agricultural data sources and/or one or more data sets provided by one or more agricultural data sources. Operation builder 250 may allow a user to construct a data flow for data processing, geojoining, aggregation, and/or feature engineering.

Feature engineering and data processing interface 240 may also include map 254, which may provide an interface, including, e.g., geographic region selection button 256, by which a user may provide user input indicating a geometry 262, the geometry defining a geographic region on which to perform the operations defined using operation builder 250. For example, a user may select geographic region selection button 256 and then use touch input and/or mouse input to draw the geometry 262 on the map 254. Map 254 may also include zoom adjustment element 258, which is depicted as a slider. Geographic region selection button 256 and zoom adjustment element 258 may take other forms, such as check boxes (e.g., to apply/remove data sources), text inputs, sliders, radio buttons, etc.

Map 254 currently is rendering an overhead view of a geographic region that includes numerous individual agricultural fields (demarcated by the polygons of various shapes) and a body of water 260. While the agricultural fields are largely rectangular, this is not meant to be limiting, and agricultural fields can (and often do) take any geometric shape, including any polygon shape, ovular, circular, triangular, etc. In FIG. 2, distinct fill patterns may signify values/attributes of a property (each fill pattern signifying a different value/attribute of the property, e.g., soil type) or may signify values/attributes of an agricultural analysis result (e.g., a result of the operations defined using operation builder 250). While different values/attributes are demarcated in FIG. 2 using different fill patterns, other types of visual annotations, such as color fills having various levels of transparency, may be used in addition to or instead of fill patterns.

In some implementations, AMS 107 and/or UI module 120 may be configured to generate and present additional visual annotations in association with various agricultural fields, in addition to or instead of the colors or fill patterns described previously. For example, a user may wish to understand the soil composition of various agricultural fields, or other properties of various areas of farmland. The additional visual annotation(s) therefore may be generated to convey one or more properties associated with various areas of farmland.

These additional visual annotations may be textual and/or non-textual. In some implementations, these additional annotations may be presented to a user (e.g., of AMS 107) when they somehow interact with various areas of farmland, such as by clicking on an individual agricultural field, operating a pointing device such as a mouse to hover a graphical element such as a cursor over an individual field, etc. The additional visual annotation may be presented in various locations, such as in a pop-up window (e.g., over map 254 or elsewhere on the GUI), on a separate portion of the GUI from an overhead view, as text the overlays an overhead view of agricultural fields, etc.

Figure 3:
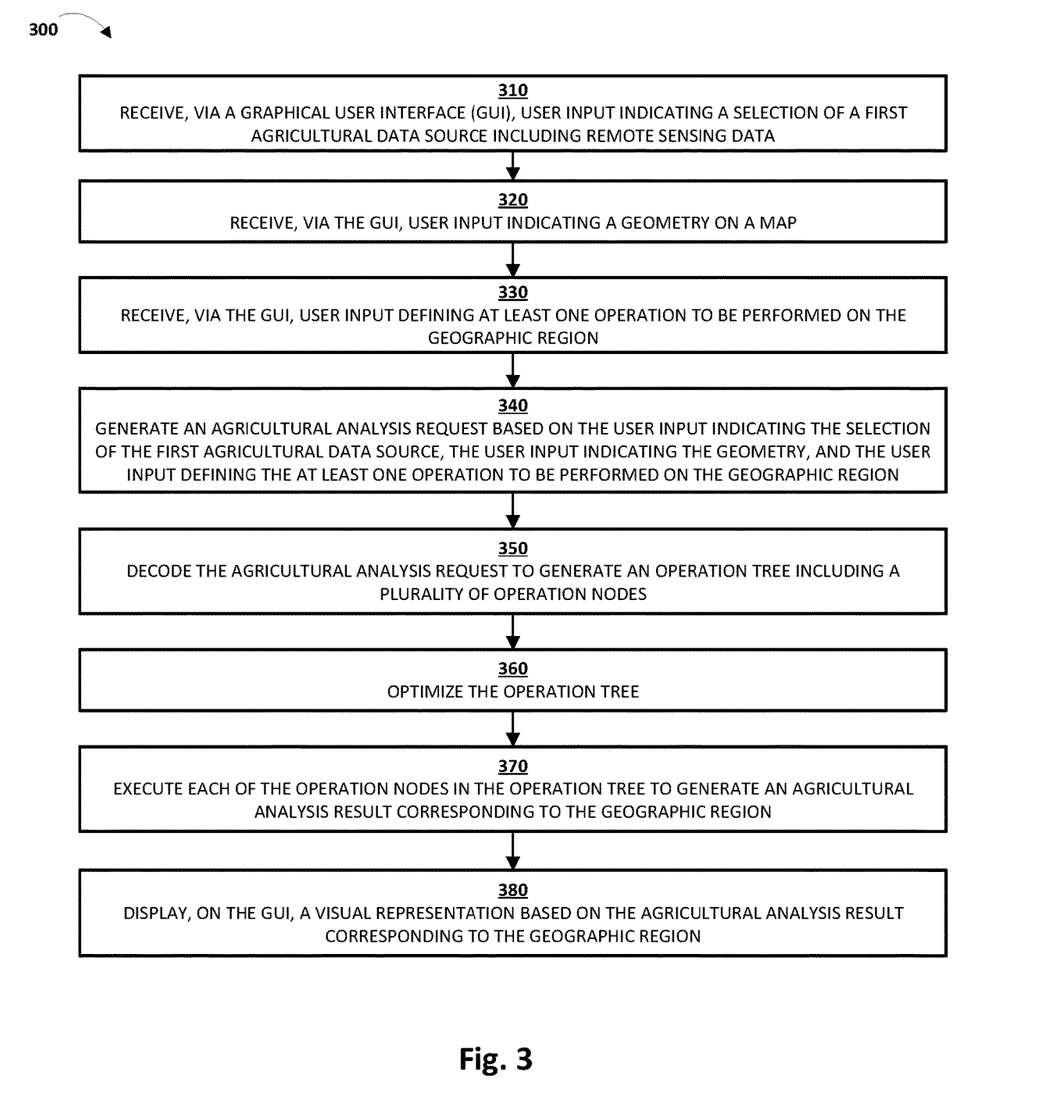
FIG. 3 depicts a flowchart illustrating an example method for practicing selected aspects of the present disclosure.

FIG. 3 is a flowchart illustrating an example method 300 of feature engineering and data processing of geospatial data, in accordance with implementations disclosed herein. For convenience, the operations of the flowchart are described with reference to a system that performs the operations. This system may include various components of various computer systems, such as one or more components of the client devices 106 and/or the farmland knowledge system 104. Moreover, while operations of method 300 are shown in a particular order, this is not meant to be limiting. One or more operations may be reordered, omitted, or added.

At block 310, the system may receive, via a graphical user interface (GUI), user input indicating a selection of a first agricultural data source including remote sensing data. In implementations, at block 310, the UI module 120 of the farmland knowledge system 104 may be configured to render, or cause AMS 107 of a client device 106 to render, as part of the GUI, an interface by which a user may provide user input indicating a selection of a first agricultural data source including remote sensing data. In some implementations, the first agricultural data source may include a satellite tile source that includes near-infrared wavelength satellite tiles. In other implementations, first agricultural data source may include a satellite tile source that includes red wavelength satellite tiles. In other implementations, the first agricultural data source may include any other agricultural data source.

Still referring to block 310, in some implementations, the system may also receive, via the GUI, user input indicating a selection of a second agricultural data source including field data. In some implementations, each of the first agricultural data source and the second agricultural data source may include raster data (e.g., in pixel level) and/or vector data (e.g., in field level). Raster data may include multi-channel matrix data, GeoTiff, PNG, and/or JPEG, among others. Vector data may include GeoJSON, CSV, and/or JSON, among others.

At block 320, the system may receive, via the GUI, user input indicating a geometry on a map. The geometry may define a geographic region on which to perform at least one operation. In implementations, at block 320, the UI module 120 of the farmland knowledge system 104 may be configured to render, or cause AMS 107 of a client device 106 to render, as part of the GUI, an interface by which a user may provide user input indicating the geometry on the map.

At block 330, the system may receive, via the GUI, user input defining the at least one operation to be performed on the geographic region. The at least one operation may use at least one satellite tile of the first agricultural data source, and the at least one satellite tile may correspond to the geographic region. In implementations, at block 330, the UI module 120 of the farmland knowledge system 104 may be configured to render, or cause AMS 107 of a client device 106 to render, as part of the GUI, an interface by which a user may provide the user input defining the at least one operation to be performed on the geographic region. The at least one operation may use at least one satellite tile of the first agricultural data source selected at block 310, and the at least one satellite tile may correspond to the geographic region defined at block 320.

Still referring to block 330, in some implementations, the at least one operation includes an add operation, a subtract operation, a multiply operation, and/or a divide operation. The user input defining the at least one operation to be performed on the geographic region may define a data flow for data processing, geo-joining, aggregation, feature engineering, and/or other user-defined operations. In one example, the at least one operation to be performed may include geo-joining and/or aggregating remote sensing data from the first agricultural data source selected at block 310 and field data from the second agricultural data source selected at block 310. In another example, the at least one operation to be performed may include computing an EVI and aggregating the time-series pixel-level EVI into the geographic region defined at block 320. In yet another example, the at least one operation to be performed may include computing a normalized difference vegetation index (NDVI). In some implementations, the field data is used as ground truth.

At block 340, the system may generate an agricultural analysis request based on the user input indicating the selection of the first agricultural data source, the user input indicating the geometry defining the geographic region on which to perform the at least one operation, and the user input defining the at least one operation to be performed on the geographic region. In implementations, at block 340, the UI module 120 of the farmland knowledge system 104 may be configured to generate, or cause AMS 107 of a client device 106 to generate, the agricultural analysis request based on the user input indicating the selection of the first agricultural data source from block 310, the user input indicating the geometry defining the geographic region on which to perform the at least one operation from block 320, and the user input defining the at least one operation to be performed on the geographic region from block 330. In some implementations, the agricultural analysis request is a JavaScript Object Notation (JSON) object. The JSON object may be serialized, and each operation may be represented in the JSON object as an operation node that includes an operation name (e.g., add, subtract, multiply, divide, etc.), arguments, and child node(s). In some implementations, the agricultural analysis request generated at block 340 is transmitted or otherwise provided to the computation service 122, which may receive the agricultural analysis request.

At block 350, the system may decode the agricultural analysis request to generate an operation tree including a plurality of operation nodes. In some implementations, at block 350, the computation service 122 may provide the agricultural analysis request, generated by UI module 120 or AMS 107 and transmitted or otherwise provided to the computation service 122 at block 340, to the decoder 124 for decoding of agricultural analysis request to generate the operation tree including the plurality of operation nodes. In some implementations, the operation tree may be a directed acyclic graph.

At block 360, the system may optimize the operation tree. In some implementations, at block 360, the decoder 124 may optimize the operation tree generated at block 350 by decoding the agricultural analysis request. In some implementations, at block 360, optimizing the operation tree includes the decoder 124 removing duplicate operations from the operation tree generated at block 350 and generating an executable queue of operations from the operation tree.

In other implementations, the flow may proceed from block 350 to block 370, without the decoder 124 optimizing the operation tree at block 360.

At block 370, the system may execute each of the operation nodes in the operation tree to generate an agricultural analysis result corresponding to the geographic region. In some implementations, at block 370, the decoder 124 may provide the operation tree, generated at block 350 and optionally optimized at block 360, to the computing engine 126, and the computing engine 126 may execute each of the operation nodes in the operation tree to generate the agricultural analysis result corresponding to the geographic region defined at block 320. In some implementations, the computing engine 126 executes each operation in the executable queue of operations generated from the operation tree at block 360. For example, the computing engine 126 may fetch satellite tiles (e.g., from agricultural data store 128), generate a GeoJSON table, and execute arithmetic operations. Computing engine 126 may use a hash map to cache temporary results while executing the operation nodes of the operation tree.

At block 380, the system may display, on the GUI, a visual representation based on the agricultural analysis result corresponding to the geographic region. In some implementations, at block 380, the computing engine 126 may provide the agricultural analysis result generated at block 370 to the computation service 122, as a response to the agricultural analysis request transmitted or otherwise provided to the computation service 122 at block 340. The computation service 122 may provide the agricultural analysis result generated to the UI module 120, which may be configured to display, or cause AMS 107 of a client device 106 to display, the visual representation based on the agricultural analysis result, corresponding to the geographic region.

Still referring to block 380, in addition to or instead of displaying the visual representation based on the agricultural analysis result, the system may utilize the agricultural analysis result to train a machine learning model. For example, the agricultural analysis result may be used to train a crop yield prediction model.

Still referring to block 380, in some implementations, the analysis result may be used in further analysis. For example, the analysis result may be selected at block 310 and utilized at block 330 by the at least one operation, instead of or in addition to the first agricultural data source including remote sensing data.

Figure 4:
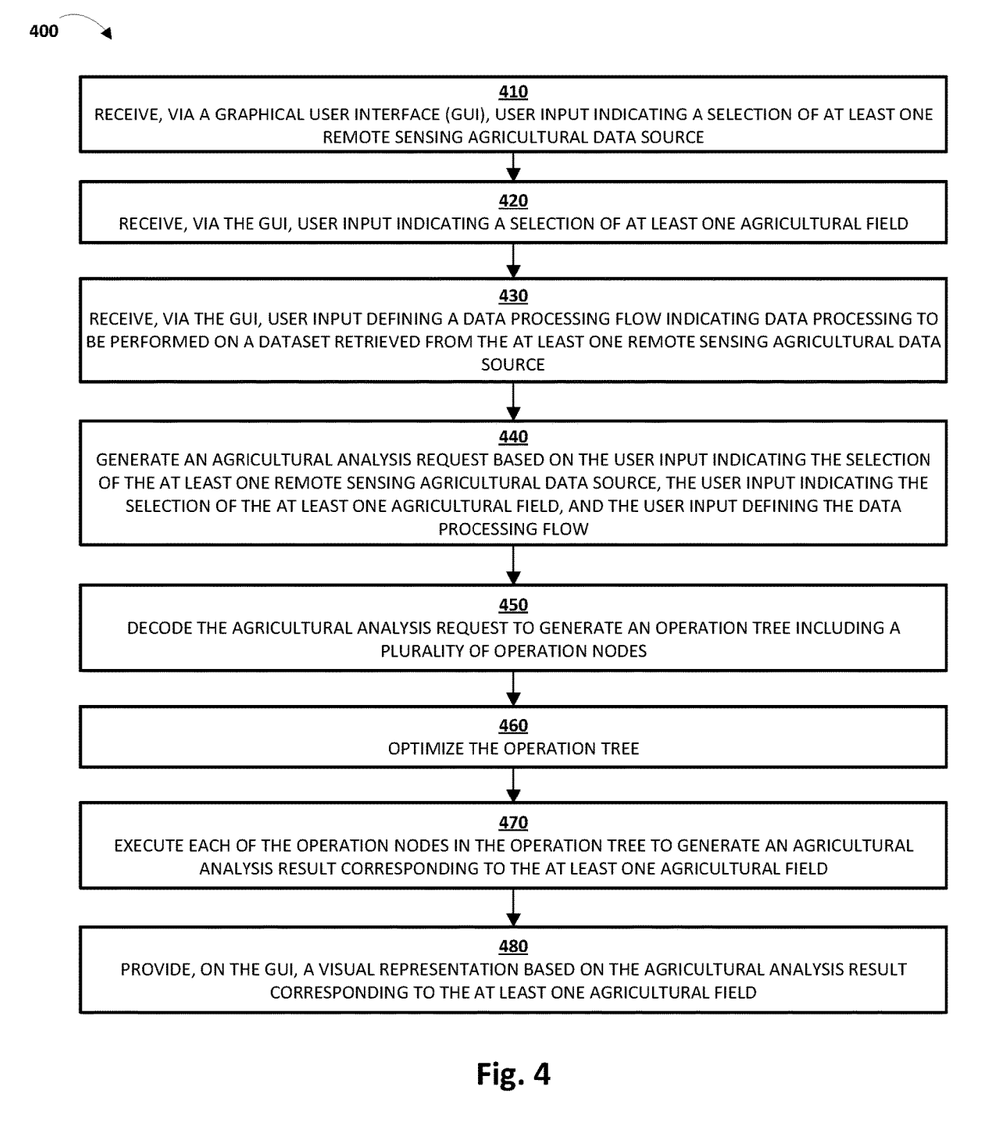
FIG. 4 depicts another flowchart illustrating an example method for practicing selected aspects of the present disclosure.

FIG. 4 is a flowchart illustrating an example method 400 of feature engineering and data processing of geospatial data, in accordance with implementations disclosed herein. For convenience, the operations of the flowchart are described with reference to a system that performs the operations. This system may include various components of various computer systems, such as one or more components of the client devices 106 and/or the farmland knowledge system 104. Moreover, while operations of method 400 are shown in a particular order, this is not meant to be limiting. One or more operations may be reordered, omitted, or added.

At block 410, the system may receive, via a graphical user interface (GUI), user input indicating a selection of at least one remote sensing agricultural data source. In implementations, at block 410, the UI module 120 of the farmland knowledge system 104 may be configured to render, or cause AMS 107 of a client device 106 to render, as part of the GUI, an interface by which a user may provide user input indicating a selection of at least one remote sensing agricultural data source. In some implementations, the at least one remote sensing agricultural data source may include a satellite tile source that includes near-infrared wavelength satellite tiles. In other implementations, the at least one remote sensing agricultural data source may include a satellite tile source that includes red wavelength satellite tiles. In other implementations, the at least one remote sensing agricultural data source may include any other agricultural data source.

Still referring to block 410, in some implementations, the system may also receive, via the GUI, user input indicating a selection of a field data agricultural data source. In some implementations, each of the remote sensing agricultural data source and the field data agricultural data source may include raster data (e.g., in pixel level) and/or vector data (e.g., in field level). Raster data may include multi-channel matrix data, GeoTiff, PNG, and/or JPEG, among others. Vector data may include GeoJSON, CSV, and/or JSON, among others.

At block 420, the system may receive, via the GUI, user input indicating a selection of at least one agricultural field. In implementations, at block 420, the UI module 120 of the farmland knowledge system 104 may be configured to render, or cause AMS 107 of a client device 106 to render, as part of the GUI, an interface by which a user may provide user input indicating a selection of the at least one agricultural field.

At block 430, the system may receive, via the GUI, user input defining a data processing flow indicating data processing to be performed on a dataset retrieved from the at least one remote sensing agricultural data source. The dataset may include tiles corresponding to the at least one agricultural field. In implementations, at block 430, the UI module 120 of the farmland knowledge system 104 may be configured to render, or cause AMS 107 of a client device 106 to render, as part of the GUI, an interface by which a user may provide the user input defining the data processing flow indicating data processing to be performed on the dataset retrieved from the at least one remote sensing agricultural data source selected at block 410. The dataset may include tiles corresponding to the at least one agricultural field selected at block 420.

Still referring to block 430, in some implementations, the data processing flow includes an add operation, a subtract operation, a multiply operation, and/or a divide operation. The data processing flow may include geo-joining, aggregation, feature engineering, and/or other user-defined data processing operations. In one example, the data processing flow may include geo-joining and/or aggregating remote sensing data from the remote sensing agricultural data source selected at block 410 and field data from the field data agricultural data source selected at block 410. In another example, the at least one operation to be performed may include computing an EVI and aggregating the time-series pixel-level EVI into the agricultural field selected at block 420. In yet another example, the at least one operation to be performed may include computing a normalized difference vegetation index (NDVI). In some implementations, the field data is used as ground truth.

At block 440, the system may generate an agricultural analysis request based on the user input indicating the selection of the at least one remote sensing agricultural data source, the user input indicating the selection of the at least one agricultural field, and the user input defining the data processing flow. In implementations, at block 440, the UI module 120 of the farmland knowledge system 104 may be configured to generate, or cause AMS 107 of a client device 106 to generate, the agricultural analysis request based on the user input indicating the selection of the at least one remote sensing agricultural data source from block 410, the user input indicating the selection of the at least one agricultural field from block 420, and the user input defining the data processing flow from block 430. In some implementations, the agricultural analysis request is a JavaScript Object Notation (JSON) object. The JSON object may be serialized, and each operation may be represented in the JSON object as an operation node that includes an operation name (e.g., add, subtract, multiply, divide, etc.), arguments, and child node(s). In some implementations, the agricultural analysis request generated at block 440 is transmitted or otherwise provided to the computation service 122, which may receive the agricultural analysis request.

At block 450, the system may decode the agricultural analysis request to generate an operation tree including a plurality of operation nodes. In some implementations, at block 450, the computation service 122 may provide the agricultural analysis request, generated by UI module 120 or AMS 107 and transmitted or otherwise provided to the computation service 122 at block 440, to the decoder 124 for decoding of agricultural analysis request to generate the operation tree including the plurality of operation nodes. In some implementations, the operation tree may be a directed acyclic graph.

At block 460, the system may optimize the operation tree. In some implementations, at block 460, the decoder 124 may optimize the operation tree generated at block 450 by decoding the agricultural analysis request. In some implementations, at block 460, optimizing the operation tree includes the decoder 124 removing duplicate operations from the operation tree generated at block 450 and generating an executable queue of operations from the operation tree.

In other implementations, the flow may proceed from block 450 to block 470, without the decoder 124 optimizing the operation tree at block 460.

At block 470, the system may execute each of the operation nodes in the operation tree to generate an agricultural analysis result corresponding to the at least one agricultural field. In some implementations, at block 470, the decoder 124 may provide the operation tree, generated at block 450 and optionally optimized at block 460, to the computing engine 126, and the computing engine 126 may execute each of the operation nodes in the operation tree to generate the agricultural analysis result corresponding to the at least one agricultural field selected at block 420. In some implementations, the computing engine 126 executes each operation in the executable queue of operations generated from the operation tree at block 460. For example, the computing engine 126 may fetch satellite tiles, generate a GeoJSON table, and execute arithmetic operations. Computing engine 126 may use a hash map to cache temporary results while executing the operation nodes of the operation tree.

At block 480, the system may provide, on the GUI, a visual representation based on the agricultural analysis result corresponding to the at least one agricultural field. In some implementations, at block 480, the computing engine 126 may provide the agricultural analysis result generated at block 470 to the computation service 122, as a response to the agricultural analysis request transmitted or otherwise provided to the computation service 122 at block 440. The computation service 122 may provide the agricultural analysis result generated to the UI module 120, which may be configured to provide, or cause AMS 107 of a client device 106 to provide, the visual representation based on the agricultural analysis result corresponding to the at least one agricultural field.

Still referring to block 480, in addition to or instead of displaying the visual representation based on the agricultural analysis result, the system may utilize the agricultural analysis result to train a machine learning model. For example, the agricultural analysis result may be used to train a crop yield prediction model.

Still referring to block 480, in some implementations, the analysis result may be used in further analysis. For example, the analysis result may be selected at block 410 and utilized at block 430 in the data processing flow, instead of or in addition to the at least one remote sensing agricultural data source.

Figure 5:
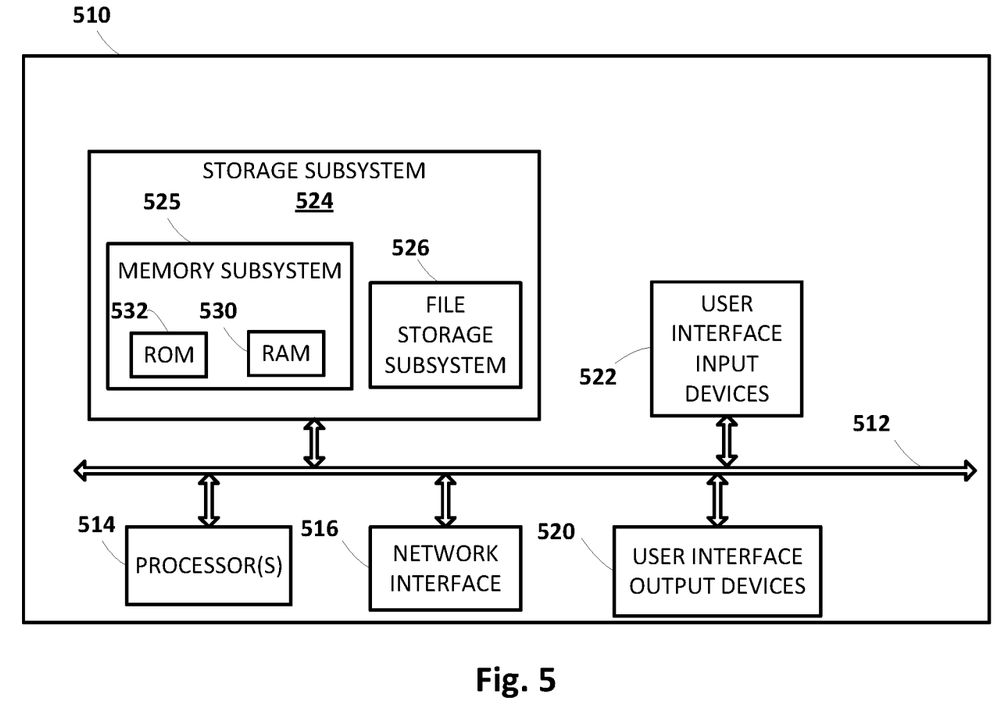
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 3 and 4, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored.

A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving, via a graphical user interface (GUI), user input indicating a selection of a first agricultural data source including remote sensing data;
    receiving, via the GUI, user input indicating a geometry on a map, the geometry defining a geographic region on which to perform at least one operation;
    receiving, via the GUI, user input defining the at least one operation to be performed on the geographic region, the at least one operation using at least one satellite tile of the first agricultural data source, the at least one satellite tile corresponding to the geographic region;
    generating an agricultural analysis request based on the user input indicating the selection of the first agricultural data source, the user input indicating the geometry defining the geographic region on which to perform the at least one operation, and the user input defining the at least one operation to be performed on the geographic region;
    decoding the agricultural analysis request to generate an operation tree including a plurality of operation nodes;
    executing each of the operation nodes in the operation tree to generate an agricultural analysis result corresponding to the geographic region; and
    displaying, on the GUI, a visual representation based on the agricultural analysis result corresponding to the geographic region.

2. The method according to claim 1, further including:
    receiving, via the GUI, user input indicating a selection of a second agricultural data source including field data, and wherein the at least one operation further uses the field data of the second agricultural data source; and
    generating the agricultural analysis request is further based on the user input indicating the selection of the second agricultural data source.

3. The method according to claim 2, wherein the field data includes observational crop data obtained by farm machinery.

4. The method according to claim 2, wherein the field data is used as ground truth.

5. The method according to claim 1, wherein the first agricultural data source includes a satellite tile source including near-infrared wavelength satellite tiles.

6. The method according to claim 1, wherein the first agricultural data source includes a satellite tile source including red wavelength satellite tiles.

7. The method according to claim 1, wherein the at least one operation includes an add operation, a subtract operation, a multiply operation, and/or a divide operation.

8. The method according to claim 1, wherein the agricultural analysis request is a JavaScript Object Notation (JSON) object.

9. The method according to claim 1, further including optimizing the operation tree, prior to executing each of the operation nodes in the operation tree, wherein optimizing the operation tree includes removing duplicate operations from the operation tree.

10. The method according to claim 1, wherein the operation tree is a directed acyclic graph.

11. A computer program product comprising one or more non-transitory computer-readable storage media having program instructions collectively stored on the one or more non-transitory computer-readable storage media, the program instructions executable to:
    receive, via a graphical user interface (GUI), user input indicating a selection of at least one remote sensing agricultural data source;
    receive, via the GUI, user input indicating a selection of at least one agricultural field;
    receive, via the GUI, user input defining a data processing flow indicating data processing to be performed on a dataset retrieved from the at least one remote sensing agricultural data source, the dataset including tiles corresponding to the at least one agricultural field;
    generate an agricultural analysis request based on the user input indicating the selection of the at least one remote sensing agricultural data source, the user input indicating the selection of the at least one agricultural field, and the user input defining the data processing flow;
    decode the agricultural analysis request to generate an operation tree including a plurality of operation nodes;

execute each of the operation nodes in the operation tree to generate an agricultural analysis result corresponding to the at least one agricultural field; and provide, on the GUI, a visual representation based on the agricultural analysis result corresponding to the at least one agricultural field.

12. The computer program product according to claim 11, wherein the at least one remote sensing agricultural data source includes near-infrared wavelength satellite tiles.

13. The computer program product according to claim 11, wherein the at least one remote sensing agricultural data source includes red wavelength satellite tiles.

14. The computer program product according to claim 11, wherein the data processing flow includes an add operation, a subtract operation, a multiply operation, and/or a divide operation.

15. The computer program product according to claim 11, wherein the agricultural analysis request is a JavaScript Object Notation (JSON) object.

16. The computer program product according to claim 11, wherein the program instructions are further executable to optimize the operation tree, prior to executing each of the operation nodes in the operation tree, wherein optimizing the operation tree includes removing duplicate operations from the operation tree.

17. A system comprising:
a processor;
a computer-readable memory;
one or more computer-readable storage media; and
program instructions collectively stored on the one or more computer-readable storage media, the program instructions executable to:
receive, via a graphical user interface (GUI), user input indicating a selection of a first agricultural data source including remote sensing data;
receive, via the GUI, user input indicating a geometry on a map, the geometry defining a geographic region on which to perform at least one operation;
receive, via the GUI, user input defining the at least one operation to be performed on the geographic region, the at least one operation using at least one satellite tile of the first agricultural data source, the at least one satellite tile corresponding to the geographic region;
generate an agricultural analysis request based on the user input indicating the selection of the first agricultural data source, the user input indicating the geometry defining the geographic region on which to perform the at least one operation, and the user input defining the at least one operation to be performed on the geographic region;
decode the agricultural analysis request to generate an operation tree including a plurality of operation nodes;
execute each of the operation nodes in the operation tree to generate an agricultural analysis result corresponding to the geographic region; and
display, on the GUI, a visual representation based on the agricultural analysis result corresponding to the geographic region.

18. The system according to claim 17, the program instructions further executable to:
receive, via the GUI, user input indicating a selection of a second agricultural data source including field data, and wherein the at least one operation further uses the field data of the second agricultural data source; and
generate the agricultural analysis request further based on the user input indicating the selection of the second agricultural data source.

19. The system according to claim 17, wherein field data includes observational crop data obtained by farm machinery.

20. The system according to claim 17, wherein the first agricultural data source includes near-infrared wavelength satellite tiles or red wavelength satellite tiles.

* * * * *